UNITED STATES PATENT OFFICE.

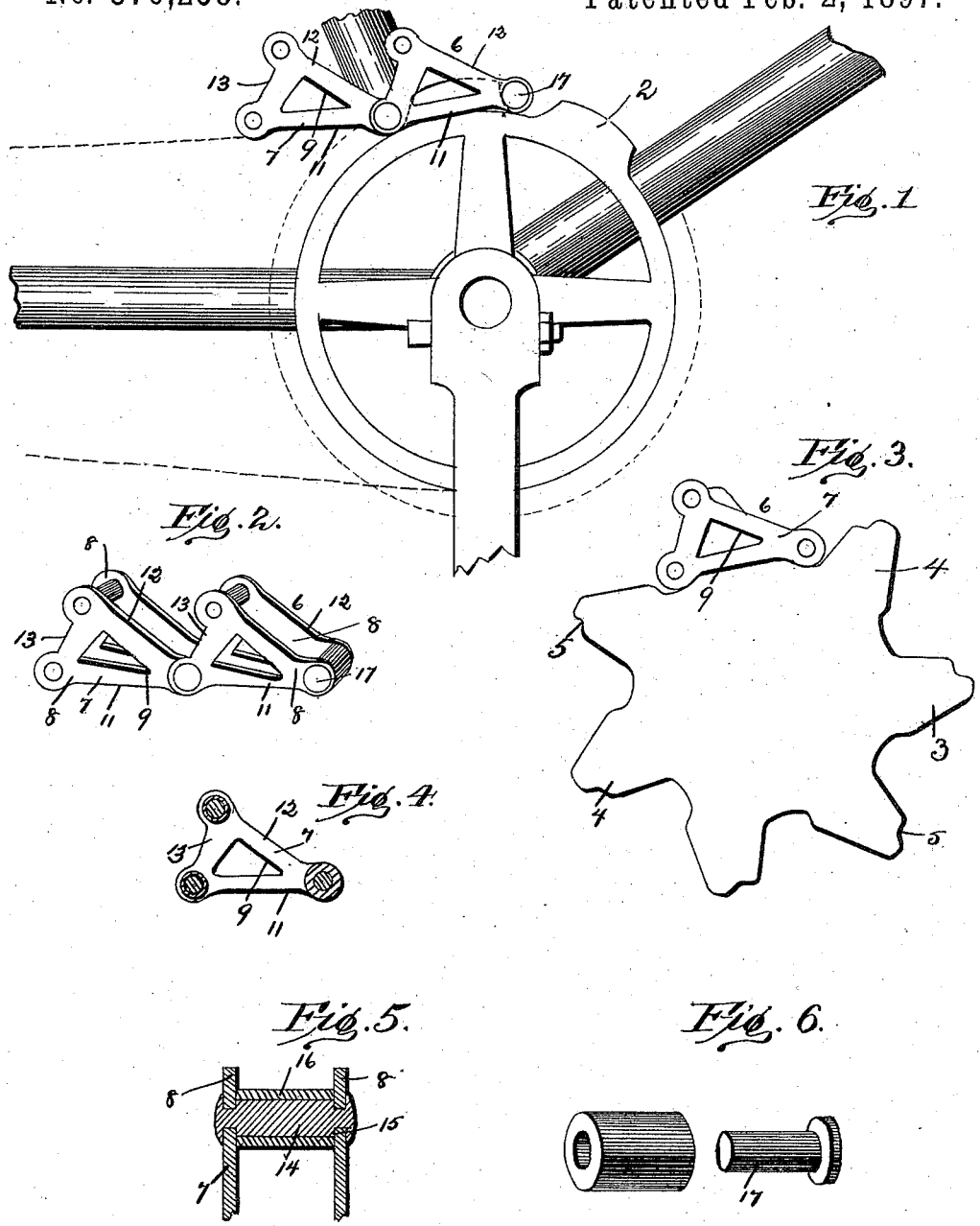

LEWIS COOK, OF RAVENNA, OHIO.

BICYCLE-CHAIN.

SPECIFICATION forming part of Letters Patent No. 576,258, dated February 2, 1897.

Application filed June 4, 1896. Serial No. 594,271. (No model.)

*To all whom it may concern:*

Be it known that I, LEWIS COOK, a citizen of the United States, residing at Ravenna, in the county of Portage and State of Ohio, have invented certain new and useful Improvements in Bicycle-Chains; and I do hereby declare the following to be a full, clear, and exact description of the invention, such as will enable others skilled in the art to which it appertains to make and use the same.

My invention relates to certain new and useful improvements in sprocket-chains and sprocket-wheels for bicycles, the object of the same being to provide a sprocket-chain which is stronger and more durable than the chains now in use, which is prevented from slipping off the sprocket-wheel, and in which a better grip is obtained and greater power is exerted by the sprocket-wheel driving said chain.

The invention consists of a chain made up of a series of links formed of parallel pairs of triangular webs or plates which are bolted together at their apices, and the webs or plates forming a part of adjacent links are pivoted one to the other. The sprocket-wheel employed by me is one in which the recess between the teeth acts as a guide upon the pivots between adjacent links, and the said wheel is formed with teeth projecting radially therefrom, which have their ends notched or cut away for engaging the bolt connecting the apices of the triangular plates forming the links.

The invention also consists in other details of construction and combinations of parts, which will be hereinafter more fully described and claimed.

In the drawings forming part of this specification, Figure 1 represents a side elevation of a portion of a bicycle with my improved sprocket-chain and sprocket-wheel shown thereon. Fig. 2 is a detail perspective view of a short section of chain. Fig. 3 is a similar view of the sprocket-wheel upon the rear wheel of the bicycle. Fig. 4 is a longitudinal section through the pivotal connections between the adjacent links. Fig. 5 is a cross-section through the bolt which connects the triangular plates forming the links at the apices thereof. Fig. 6 is a detail view of the bolt and sleeve connecting the pairs of plates forming the links.

Like reference-numerals indicate like parts in the different views.

The pedal-shaft 1 of the bicycle has a sprocket-wheel 2 of ordinary construction secured thereto, and the rear wheel of the bicycle has a sprocket-wheel 3, secured to it, of peculiar construction. The said sprocket-wheel 3 is formed with radially-extending teeth 4 4, each of which has a notch or cut-away portion 5 on one side thereof near its outer end. Extending around the sprocket-wheels 2 and 3 is my improved chain 6, made up of a series of links 7, each composed of a pair of parallel triangular plates or webs 8 8, as clearly shown. The plates or webs are preferably formed with triangular openings 9 therein for the purpose of decreasing the weight of the chain. The base 11 of the triangular plates 8 is slightly longer than the side 12, and the side 13 is slightly shorter than the side 12. The members of each pair of plates 8 8, constituting a link, are connected at their apex points by a bolt 14, which is formed with shoulders 15 and riveted to the outer end of one of said plates or webs. Surrounding the bolt 14 is a sleeve 16. The links 7 are pivotally connected to each other by bolts 17 17, passing through the adjacent ends of the plates or webs 8, the ends of one pair of said plates being slightly compressed and the ends of the pair of plates which fit thereon being flared outward slightly, so that when they are united the outer surface of the chain will present an unbroken line. As the chain 6 passes over the sprocket-wheels 2 and 3 the pivotal bolts 17 pass between the teeth of the sprocket-wheel 2, the teeth themselves projecting up between the webs 8, constituting the links. The said bolts 17 therefore serve as guides, and the chain is prevented from slipping off by reason of the engagement of the teeth of the sprocket-wheel 2 with the inner surfaces of the webs of which the links are made up. With the sprocket-wheel 3 upon the rear of the bicycle the action is somewhat similar, the bolts 17 17 fitting between the teeth 4 of said wheel and the outer ends of said teeth engaging the bolts 14, the said bolts fitting within the notches or cut-away portions 5 of the teeth 4. It will thus be seen that a firm grip is obtained between the sprocket-wheel and the chain; also, that slipping of the chain from the sprocket-wheel is positively prevented.

By the construction of my sprocket-chain 6 I am enabled to reverse the same upon the sprocket-wheels 2 and 3, and when reversed the teeth 4 will not engage the bolts 14 in said chain.

Having now described my invention, what I claim as new, and desire to secure by Letters Patent, is—

1. The combination, with a sprocket-wheel having radial teeth thereon, each formed with a notch or cut-away portion on one side near its outer end, of a sprocket-chain consisting of a series of links pivotally connected together, each link made up of a pair of parallel triangular plates or webs and a bolt connecting each pair of webs at their apices, which bolt is adapted to fit within and be engaged by the cut-away portion on the ends of said teeth, substantially as and for the purpose set forth.

2. The combination with a sprocket-wheel having radial teeth thereon, each formed with a notch or cut-away portion on one side near its outer end, of a sprocket-chain, consisting of a series of links pivotally connected together, each link made up of a pair of parallel triangular plates or webs, a bolt connecting each pair of webs at their apices and a sleeve or roller surrounding each of said bolts, the said sleeve or roller being adapted to fit within and to be engaged by the cut-away portion on the outer ends of said teeth, substantially as and for the purpose set forth.

In testimony whereof I have signed this specification in the presence of two subscribing witnesses.

LEWIS COOK.

Witnesses:
F. L. PARSHALL,
HOWARD D. COOK.